(12) United States Patent
Lieberman et al.

(10) Patent No.: US 7,800,777 B2
(45) Date of Patent: Sep. 21, 2010

(54) AUTOMATIC IMAGE QUALITY CONTROL OF MARKING PROCESSES

(75) Inventors: David J. Lieberman, Fairport, NY (US); William A. Blitz, Webster, NY (US); Michael C. Mongeon, Walworth, NY (US); Roger L. Triplett, Penfield, NY (US); John A. Moore, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1167 days.

(21) Appl. No.: 11/432,924

(22) Filed: May 12, 2006

(65) Prior Publication Data

US 2007/0263238 A1    Nov. 15, 2007

(51) Int. Cl.
G06K 15/22 (2006.01)
H04N 1/00 (2006.01)
H04N 1/46 (2006.01)
G03G 15/00 (2006.01)

(52) U.S. Cl. .................. 358/1.4; 358/504; 358/406; 399/46; 399/49; 399/72

(58) Field of Classification Search .................. 358/1.4, 358/504, 406; 399/46, 49, 72
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,710,785 A | 12/1987 | Mills | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,436,705 A * | 7/1995 | Raj | 399/59 |
| 5,473,419 A | 12/1995 | Russel et al. | |
| 5,489,969 A | 2/1996 | Soler et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

Primary Examiner—King Y Poon
Assistant Examiner—Vincent R Peren
(74) Attorney, Agent, or Firm—Fay Sharpe LLP

(57) ABSTRACT

A first series of control patches is printed with a first marking engine. A second series of control patches is printed with a second marking engine. Relative reflectance values of the patches printed with the first and second marking engines are measured with respective first and second engine response sensors. Based at least on a difference in the measured relative reflectance values of the control patches printed with the first and second marking engines, a relative engine to engine error is determined. The engine to engine error is decomposed into components. Based on the decomposition, adjustment of at least binary values of a digital image is determined so that print density of a first marking engine output substantially matches print density of a second marking engine output.

19 Claims, 8 Drawing Sheets

U.S. PATENT DOCUMENTS

| | | | |
|---|---|---|---|
| 5,504,568 | A | 4/1996 | Saraswat et al. |
| 5,510,896 | A | 4/1996 | Wafler |
| 5,525,031 | A | 6/1996 | Fox |
| 5,557,367 | A | 9/1996 | Yang et al. |
| 5,568,246 | A | 10/1996 | Keller et al. |
| 5,570,172 | A | 10/1996 | Acquaviva |
| 5,596,416 | A | 1/1997 | Barry et al. |
| 5,629,762 | A | 5/1997 | Mahoney et al. |
| 5,710,968 | A | 1/1998 | Clark et al. |
| 5,778,377 | A | 7/1998 | Marlin et al. |
| 5,884,118 | A | 3/1999 | Mestha et al. |
| 5,884,910 | A | 3/1999 | Mandel |
| 5,933,680 | A * | 8/1999 | Nishimura .................... 399/49 |
| 5,995,721 | A | 11/1999 | Rourke et al. |
| 6,035,103 | A * | 3/2000 | Zuber ......................... 358/1.9 |
| 6,035,152 | A * | 3/2000 | Craig et al. ................... 399/49 |
| 6,046,820 | A * | 4/2000 | Konishi ....................... 358/1.9 |
| 6,059,284 | A | 5/2000 | Wolf et al. |
| 6,125,248 | A | 9/2000 | Moser |
| 6,147,698 | A * | 11/2000 | Zable et al. ................. 347/240 |
| 6,241,242 | B1 | 6/2001 | Munro |
| 6,297,886 | B1 | 10/2001 | Cornell |
| 6,337,958 | B1* | 1/2002 | Stanich et al. ................ 399/49 |
| 6,341,773 | B1 | 1/2002 | Aprato et al. |
| 6,384,918 | B1 | 5/2002 | Hubble, III et al. |
| 6,404,511 | B1* | 6/2002 | Lin et al. ...................... 358/1.9 |
| 6,418,281 | B1 | 7/2002 | Ohki |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,628,426 | B2* | 9/2003 | Denton et al. ................ 358/1.9 |
| 6,633,382 | B2 | 10/2003 | Hubble, III et al. |
| 6,639,669 | B2 | 10/2003 | Hubble, III et al. |
| 6,760,553 | B2* | 7/2004 | Mitsuya et al. ............... 399/38 |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 6,973,286 | B2 | 12/2005 | Mandel et al. |
| 7,006,250 | B2* | 2/2006 | Denton et al. ................ 358/1.9 |
| 7,024,152 | B2 | 4/2006 | Lofthus et al. |
| 7,580,152 | B2* | 8/2009 | Kimura ....................... 358/1.9 |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2003/0164960 | A1* | 9/2003 | Housel ....................... 358/1.9 |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0196480 | A1* | 10/2004 | Foster et al. ................. 358/1.9 |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2005/0088672 | A1* | 4/2005 | Johnson ...................... 358/1.9 |
| 2006/0033771 | A1 | 2/2006 | Lofthus et al. |
| 2006/0039728 | A1 | 2/2006 | deJong et al. |
| 2006/0066885 | A1 | 3/2006 | Anderson et al. |
| 2006/0067756 | A1 | 3/2006 | Anderson et al. |
| 2006/0067757 | A1 | 3/2006 | Anderson et al. |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005. Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598. filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.

U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.

* cited by examiner

AUTOMATIC IMAGE QUALITY CONTROL OF MARKING PROCESSES

CROSS REFERENCE TO RELATED PATENTS AND PATENT APPLICATIONS

The following patent and patent applications, the disclosures of each being totally incorporated herein by reference are mentioned:

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/189,371, filed Jul. 26, 2005, entitled "PRINTING SYSTEM," by Steven R. Moore, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS", by Goodman, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/274,638, filed Nov. 15, 2005, entitled "GAMUT SELECTION IN MULTI-ENGINE SYSTEMS," by Wencheng Wu, et al.;

U.S. Patent Publication No. 2003/0090729, published May 15, 2003, entitled "RANK-ORDER ERROR DIFFUSION IMAGE PROCESSING," by Loce et al.; and U.S. patent application Ser. No. 11/013,787, filed Dec. 17, 2004, entitled "SYSTEMS AND METHODS FOR RANK-ORDERED ERROR DIFFUSION IMAGE PROCESSING," by Beilei Xu et al.

BACKGROUND

The following relates to printing systems. It finds particular application in conjunction with adjusting image quality in printing or marking systems with multiple electrophotographic or xerographic print engines. However, it is to be appreciated that the present exemplary embodiment is also amenable to other like applications.

Typically, in image rendering or printing systems, it is desirable that a rendered, or printed image closely match, or have similar aspects or characteristics to a desired target or input image. However, many factors, such as temperature, humidity, ink or toner age, and/or component wear, tend to move the output of a printing system away from the ideal or target output. For example, in xerographic marking engines, system component tolerances and drifts, as well as environmental disturbances, may tend to move an engine response curve (ERC) away from an ideal, desired or target engine response and toward an engine response that yields images that are lighter or darker than desired.

In the printing systems including multiple printing engines, the importance of engine response control or stabilization is amplified. Subtle changes that may be unnoticed in the output of a single marking engine can be highlighted in the output of a multi-engine image marking system. For example, the facing pages of an opened booklet printed by a multi-engine printing system can be printed by different print engines. For instance, the left-hand page in an open booklet may be printed by a first print engine while the right-hand page may be printed by a second print engine. The first print engine may be printing images in a manner slightly darker than the ideal and well within a single engine tolerance; while the second print engine may be printing images in a manner slightly lighter than the ideal and also within the single engine tolerance. While a user might not ever notice the subtle variations when reviewing the output of either engine alone, when the combined output is compiled and displayed adjacently, the variation in intensity from one print engine to another may become noticeable and be perceived as an issue of quality by a user.

One approach to improve print uniformity among multiple engines is for a user to periodically inspect the print quality. When inconsistency becomes noticeable, the user initiates printing of test patches on multiple engines and scans the test patches in. The scanner reads the test patches and adjusts the xerography of the engines so that lightness of a tone reproduction curve of one engine matches lightness of a tone reproduction curve of another engine. However, this approach requires a user intervention and the scanner to scan the test patches. Additionally, such approach does not improve contrast differences. Another approach to improve image consistency among multiple engines is to print test patches with the print engines, measure the test patches against one another, analyze the measurements and provide the system with a feedback of the analyzed data to adjust the xerography of the engines to match. However, such open loop feedback approach adjusts the printers with a time delay as such process is manual.

There is a need for methods and apparatuses that overcome the aforementioned problems and others.

REFERENCES

U.S. Pat. No. 4,710,785, which issued Dec. 1, 1987 to Mills, entitled PROCESS CONTROL FOR ELECTROSTATIC MACHINE, discusses an electrostatic machine having at least one adjustable process control parameter.

U.S. Pat. No. 5,510,896, which issued Apr. 23, 1996 to Wafler, entitled AUTOMATIC COPY QUALITY CORRECTION AND CALIBRATION, discloses a digital copier that includes an automatic copy quality correction and calibration method that corrects a first component of the copier using a known test original before attempting to correct other components that may be affected by the first component.

U.S. Pat. No. 5,884,118, which issued Mar. 16, 1999 to Mestha, entitled PRINTER HAVING PRINT OUTPUT LINKED TO SCANNER INPUT FOR AUTOMATIC IMAGE ADJUSTMENT, discloses an imaging machine having operating components including an input scanner for providing images on copy sheets and a copy sheet path connected to the input scanner.

U.S. Pat. No. 6,418,281, which issued Jul. 9, 2002 to Ohki, entitled IMAGE PROCESSING APPARATUS HAVING CALIBRATION FOR IMAGE EXPOSURE OUTPUT, discusses a method wherein a first calibration operation is performed in which a predetermined grayscale pattern is formed on a recording paper and this pattern is read by a reading device to produce a LUT for controlling the laser output in accordance with the image signal (gamma correction).

However, the aforementioned patents are not concerned with methods for improving or achieving image consistency between or among a plurality of marking engines.

BRIEF DESCRIPTION

In accordance with one aspect, a method is disclosed. A first series of control patches is printed with a first marking engine. A second series of control patches is printed with a second marking engine. Relative reflectance values of the patches printed with the first and second marking engines are measured with respective first and second engine response sensors. Based at least on a difference in the measured relative reflectance values of the control patches printed with the first and second marking engines, a relative engine to engine error is determined. The engine to engine error is decomposed into components. Based on the decomposition, adjustment of at least binary values of a digital image is determined so that print density of a first marking engine output substantially matches print density of a second marking engine output.

In accordance with another aspect, a document processing system is disclosed. Marking engines each prints a series of control patches of various area coverage. Response sensors each measures black tone area coverage voltage value from each patch printed with at least each respective first and second marking engine. An engine to engine error determining algorithm determines a relative engine to engine error between the first and second marking engines based at least on a difference in the measured voltage values. A decomposing device decomposes the determined engine to engine error into components. Based on the determined components, an image quality control device determines at least binary adjustment values for an image.

In accordance with another aspect, a document processing system is disclosed. Marking engines each prints a series of control patches of each preselected varying area coverage. First and second patch sensors each measures black tone area coverage voltage values from each control patch printed with at least first and second marking engines. A computer is programmed to perform steps of: based at least on a difference of the measured voltage reflectance values of the control patches printed with the first and second marking engines, determining a relative engine to engine error, extracting lightening and residual components from the engine to engine error, and based on values of the extracted components, determining at least one of adjustment of binary values of a digital image and lightness of a tone reproduction curve of at least one marking engine so that print density of a first marking engine output substantially matches print density of a second marking engine output.

DETAILED DESCRIPTION

Figure 1:
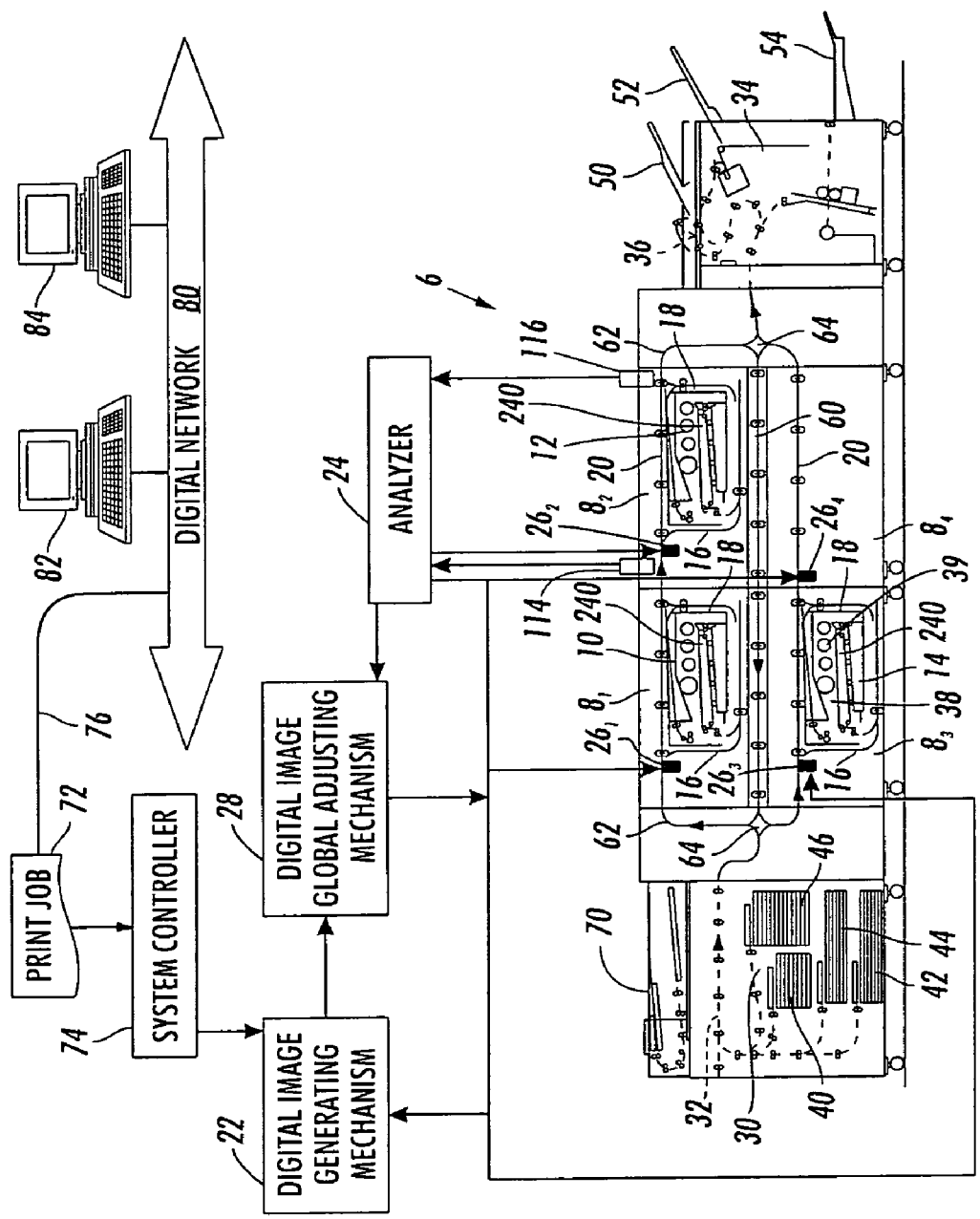
FIG. 1 is a diagrammatic representation of an image or document processing system.

With reference to FIG. 1, an example printing or document processing system 6 includes first, second, . . . , nth marking engine processing units $8_1$, $8_2$, $8_3$, . . . , $8_n$ each including an associated first, second, . . . , nth marking or print engines or devices 10, 12, 14 and associated entry and exit inverter/bypasses 16, 18. In some embodiments, marking engines are removable. For example, in FIG. 1, an integrated marking engine and entry and exit inverter/bypasses of the processing unit $8_4$ are shown as removed, leaving only a forward or upper paper path 20. In this manner, for example, the functional marking engine portion can be removed for repair, or can be replaced to effectuate an upgrade or modification of the printing system 6. While three marking engines 10, 12, 14 are illustrated (with the fourth marking engine being removed), the number of marking engines can be one, two, three, four, five, or more. Providing at least two marking engines typically provides enhanced features and capabilities for the printing system 6 since marking tasks can be distributed amongst the at least two marking engines. Some or all of the marking engines 10, 12, 14 may be identical to provide redundancy or improved productivity through parallel printing. Alternatively or additionally, some or all of the marking engines 10, 12, 14 may be different to provide different capabilities. For example, the marking engines 12, 14 may be color marking engines, while the marking engine 10 may be a black (K) marking engine. A digital image generating mechanism or device or algorithm 22 generates a digital image to be printed by the marking engines 10, 12, 14. As discussed in detail below, an analyzer 24 matches measured print densities or relative reflectance values between the marking engines to avoid noticeable image differences within a print job by adjusting at least one of binary values of the digital image and xerography. For example, a processing unit $26_1, 26_2, \ldots, 26_n$ of each associated marking engine 10, 12, 14 adjusts the digital image and/or xerography locally, at each marking engine 10, 12, 14 before printing. As another example, the digital image and/or xerography are adjusted globally, before the digital image is sent to the marking engines 10, 12, 14 for imaging. Of course, it is also contemplated that any combination of the above examples can be employed.

With continuing reference to FIG. 1, the illustrated marking engines 10, 12, 14 employ xerographic printing technology, in which an electrostatic image is formed and coated with a toner material, and then transferred and fused to paper or another print medium by application of heat and pressure. However, marking engines employing other printing technologies can be provided, such as marking engines employing ink jet transfer, thermal impact printing, or so forth. The processing units of the printing system 6 can also be other than marking engines; such as, for example, a print media feeding source or feeder 30 which includes associated print media conveying components 32. The media feeding source 30 supplies paper or other print media for printing. Another example of the processing unit is a finisher 34 which includes associated print media conveying components 36. The finisher 34 provides finishing capabilities such as collation, stapling, folding, stacking, hole-punching, binding, postage stamping, and so forth. The print media is printed by an imaging component 38 of each associated engine and fused by an associated fuser 39.

The print media feeding source 30 includes print media sources or input trays 40, 42, 44, 46 connected with the print media conveying components 32 to provide selected types of print media. While four print media sources are illustrated, the number of print media sources can be one, two, three, four, five, or more. Moreover, while the illustrated print media sources 40, 42, 44, 46 are embodied as components of the dedicated print media feeding source 30, in other embodiments one or more of the marking engine processing units may include its own dedicated print media source instead of or in addition to those of the print media feeding source 30. Each of the print media sources 40, 42, 44, 46 can store sheets of the same type of print media, or can store different types of print media. For example, the print media sources 42, 44 may store the same type of large-size paper sheets, print media source 40 may store company letterhead paper, and the print media source 46 may store letter-size paper. The print media can be substantially any type of media upon which one or more of the marking engines 10, 12, 14 can print, such as high quality bond paper, lower quality "copy" paper, overhead transparency sheets, high gloss paper, and so forth.

Since multiple jobs arrive at the finisher 34 during a common time interval, the finisher 34 includes two or more print media finishing destinations or stackers 50, 52, 54 for collecting sequential pages of each print job that is being contemporaneously printed by the printing system 6. Generally, the number of the print jobs that the printing system 6 can contemporaneously process is limited to the number of available stackers. While three finishing destinations are illustrated, the printing system 6 may include two, three, four, or more print media finishing destinations. The finisher 34 deposits each sheet after processing in one of the print media finishing destinations 50, 52, 54, which may be trays, pans, stackers and so forth. While only one finishing processing unit is illustrated, it is contemplated that two, three, four or more finishing processing units can be employed in the printing system 6.

Bypass routes 20, 60 in each marking engine processing unit provide a means by which the sheets can pass through the corresponding marking engine processing unit without interacting with the marking engine. Branch paths 62, 64 are also provided to take the sheet into the associated marking engine and to deliver the sheet back to the upper or forward paper path 20 of the associated marking engine processing unit.

The printing system 6 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets.

Print jobs can be supplied to the printing system 6 in various ways. A built-in optical scanner 70 can be used to scan a document such as book pages, a stack of printed pages, or so forth, to create a digital image of the scanned document that is reproduced by printing operations performed by the printing system 6. Alternatively, one or more print jobs 72 can be electronically delivered to a system controller 74 of the printing system 6 via a wired connection 76 from a digital network 80 that interconnects example computers 82, 84 or other digital devices. For example, a network user operating word processing software running on the computer 84 may select to print the word processing document on the printing system 6, thus generating the print job 72, or an external scanner (not shown) connected to the network 80 may provide the print job in electronic form. While a wired network connection 76 is illustrated, a wireless network connection or other wireless communication pathway may be used instead or additionally to connect the printing system 6 with the digital network 80. The digital network 80 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example. In general, any number of print media sources, media handlers, marking engines, collators, finishers or other processing units can be connected together by a suitable print media conveyor configuration. While the printing system 6 illustrates a 2×2 configuration of four marking engines, buttressed by the print media feeding source on one end and by the finisher on the other end, other physical layouts can be used, such as an entirely horizontal arrangement, stacking of processing units three or more units high, or so forth. Moreover, while in the printing system 6 the processing units have removable functional portions, in some other embodiments some or all processing units may have non-removable functional portions. It is contemplated that even if the marking engine portion of the marking engine processing unit is non-removable, associated upper or forward paper paths 20 through each marking engine processing unit enables the marking engines to be taken "offline" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some embodiments the printing system may be a stand alone printer or a cluster of networked or otherwise logically interconnected printers, with each printer having its own associated print media source and finishing components including a plurality of final media destinations.

Although several media path elements are illustrated, other path elements are contemplated which might include, for example, inverters, reverters, interposers, and the like, as known in the art to direct the print media between the feeders, printing or marking engines and/or finishers.

The controller 74 controls the production of printed sheets, the transportation over the media path, and the collation and assembly as job output by the finisher.

Figure 2:
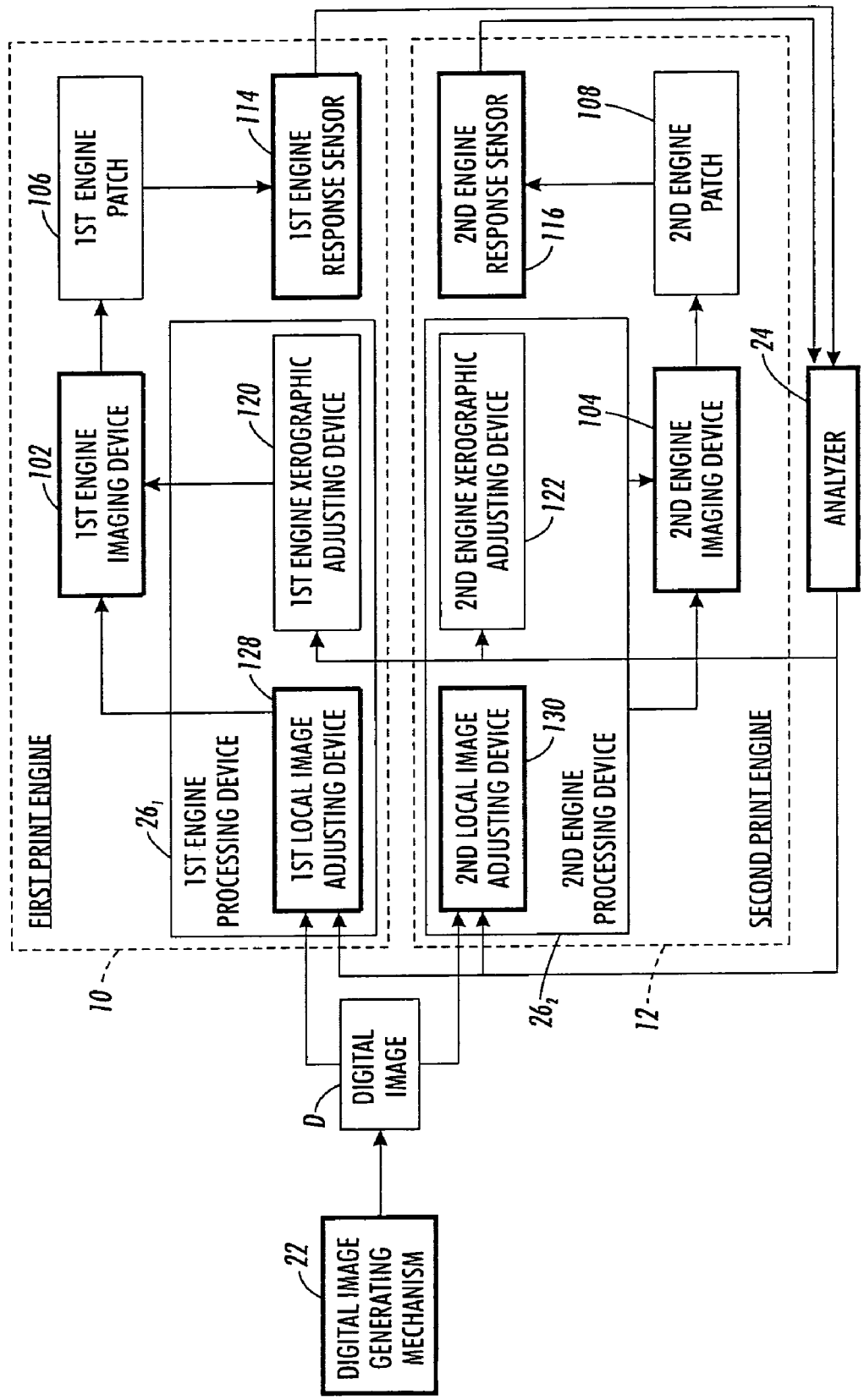
FIG. 2 diagrammatically illustrates a portion of the document processing system.
Figure 3:
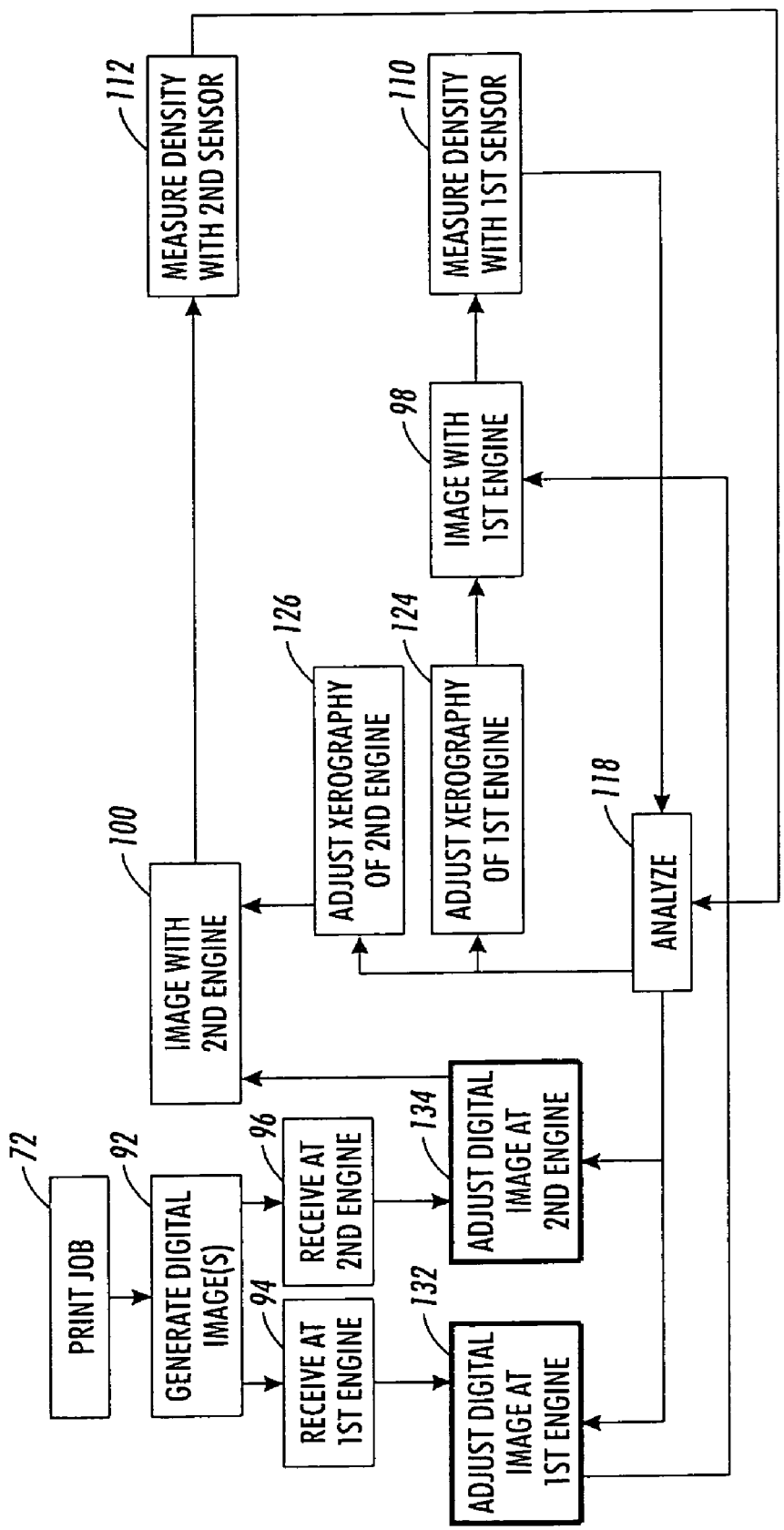
FIG. 3 is a flow chart of a portion of a control methodology for adjusting print uniformity in the document processing system.

With reference to FIGS. 2 and 3, the digital image generating mechanism or algorithm or device 22 generates 92 a digital image D to be printed by the first and second marking or print engines 10, 12. Although described with reference to the first and second marking engines 10, 12, it is contemplated that the present application is applicable to the printing systems which include more than two marking engines. The digital image is received 94, 96 by corresponding first or second print engines 10, 12 and imaged or printed 98, 100 by first and second printer or engine imaging devices 102, 104. For example, respective first and second engine patches 106, 108 are printed or imaged. As described in detail below, print density of the first and second engine patches 106, 108 is measured 110, 112 by respective first and second engine response or patch sensors 114, 116. The measurements are analyzed 118 by the analyzer 24 to determine whether adjustment of at least one of the first and second print engine 10, 12 is required. More specifically, the analyzer 24 determines whether only lightening or contrast of one of the print engines needs to be adjusted, or both lightening and contrast of at least one print engine 10, 12 needs to be adjusted. Based on the analysis, at least one of first and second engine xerographic adjusting device, mechanism, or algorithm 120, 122 adjusts 124, 126 xerography of an associated first or second print engine 10, 12 to adjust lightness of a tone reproduction curve of the associated print engine 10, 12. First and second local image adjusting devices 128, 130 adjust 132, 134 the digital image of the corresponding first or second print engine 10, 12 to adjust contrast of the image as, for example, described in U.S. Patent Application Publication No. 2003/0090729, identified above.

Figure 4:
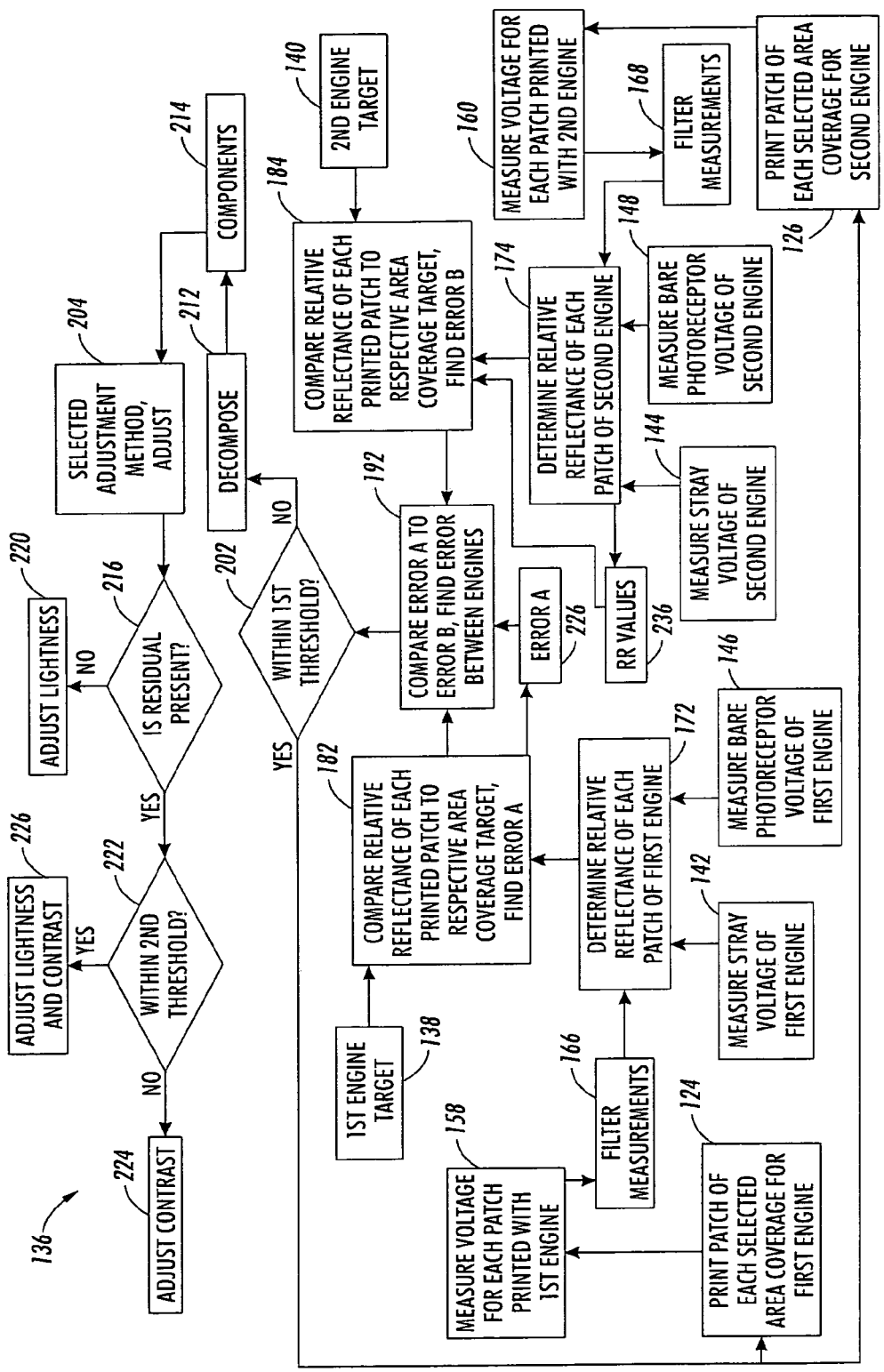
FIG. 4 is a flow chart of a detailed portion of a control methodology for adjusting print uniformity of the document processing system.

With continuing reference to FIGS. 2 and 3 further reference to FIG. 4, a control methodology approach 136 controls print consistency in the printing system 6 that includes the first and second marking or print engines 10, 12 so that the output image of the first marking engine 10 substantially matches the output image of the second marking engine 12.

More specifically, density or reflectance targets 138, 140 for corresponding first and second marking engines 10, 12 for each desired area coverage are determined, for example, in advance. The first and second response or patch sensors 114, 116 of the first and second marking engines 10, 12 acquire voltage measurements, such as black tone area coverage (BTAC) voltage measurements, from several halftone patches. More specifically, a stray light voltage value $V_{off}$ of each of the first and second marking engines 10, 12 is measured 142, 144. E.g., the stray voltage $V_{off}$ is the voltage when the lamp is OFF. A bare photoreceptor voltage $V_{bare}$ of each of the first and second marking engines 10, 12 is measured 146, 148. The digital image generating mechanism 22 generates the image data to be imaged by the first and second marking engine imaging devices 102, 104 of the associated first and second marking engines 10, 12, e.g. the digital image generating mechanism 22 generates the image data for the first and second patches 106, 108 for each selected area coverage. For example, the image data is generated for three patches, each patch corresponding to the low area coverage such as 12.5% area coverage, mid area coverage such as 50% or 60% area coverage and high area coverage such as 75% or 87.5% area coverage. The generated image data or first and second patches 106, 108 are imaged or printed 98, 100 by the respective first and second print engines 10, 12 in an interdocument zone, e.g. in the zone in which the ink is not transferred to the print media. Of course, it is contemplated that the number of patches printed and corresponding targets may be other than three, such as one, two, four, five, etc.

Figure 5:
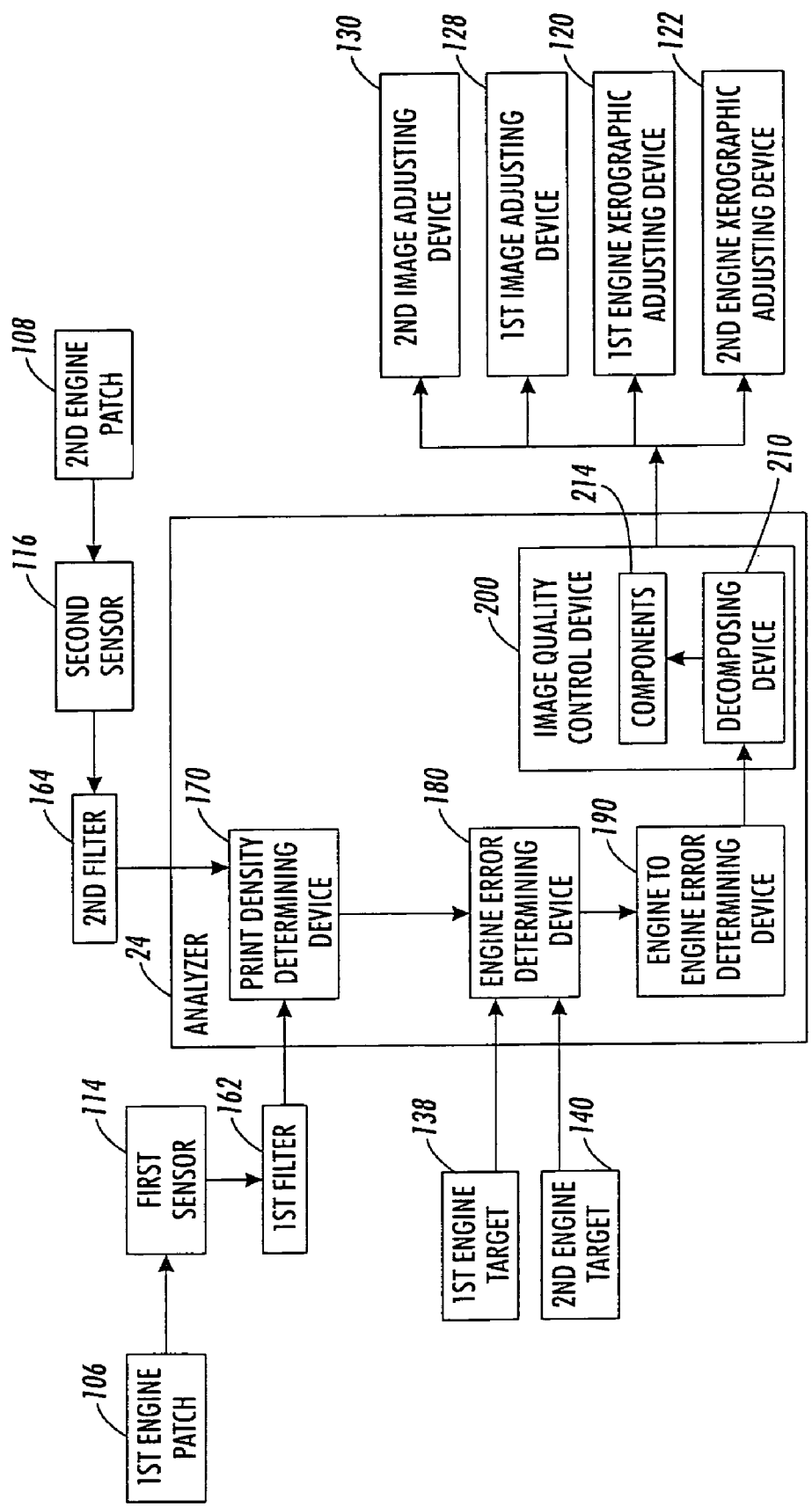
FIG. 5 diagrammatically illustrates a detailed portion of the document processing system.

With continuing reference to FIGS. 2 and 4 and further reference to FIG. 5, the first and second patch sensors 114, 116 measure voltage values 158, 160 for each patch printed with the corresponding first or second marking engines 10, 12. For example, first and second filters 162, 164 filter 166, 168 the measured voltage values or measurements. For example, the first and second filters 162, 164 average the measured voltage values, reject too low or too high values, and the like.

A print density or relative reflectance determining device 170 determines 172, 174 relative reflectance values $RR(AC)_{Engine\_A}$, $RR(AC)_{Engine\_B}$ for each patch for the first and second marking engines 10, 12. More specifically, the first and second engine relative reflectance values $RR(AC)_{Engine\_A}$, $RR(AC)_{Engine\_B}$ is each determined as a division of a difference of the patch measured voltage V(AC) and the stray voltage $V_{off}$ by a difference of the bare photoreceptor voltage $V_{bare}$ and the stray voltage $V_{off}$:

$$RR(AC)_{Engine\_A}=(V(AC)_A-V_{off\_A})/(V_{bare\_A}-V_{off\_A}); \quad (1)$$

$$RR(AC)_{Engine\_B}=(V(AC)_B-V_{off\_B})/(V_{bare\_B}-V_{off\_B}); \quad (2)$$

where $RR(AC)_{Engine\_A}$ is the relative reflectance of each patch printed with the first marking engine;

$RR(AC)_{Engine\_B}$ is the relative reflectance of each patch printed with the second marking engine;

$V(AC)_A$, $V(AC)_B$ is the voltage measurement values for each patch printed with the respective first and second marking engines;

$V_{off\_A}$, $V_{off\_B}$ is the stray light effect on sensor or stray voltage value of the respective first and second marking engines; and $V_{bare\_A}$, $V_{bare\_B}$ is the bare photoreceptor voltage values of the respective first and second marking engines.

An engine error determining device or algorithm or computer routine 180 compares 182, 184 the determined relative reflectance value of each patch printed with the first and second marking engines 10, 12 to corresponding reflectance values of the first or second engine targets 138, 140 and determines a value of the relative reflectance error A, B of each patch printed with each of the first and second marking engines 10, 12:

$$RR\_ERR(AC)_{Engine\_A} = RR(AC)_{Engine\_A} - RR(AC)_{Target\_A}, \quad (3)$$

$$RR\_ERR(AC)_{Engine\_B} = RR(AC)_{Engine\_B} - RR(AC)_{Target\_B}, \quad (4)$$

where $RR\_ERR(AC)_{Engine\_A}$, $RR\_ERR(AC)_{Engine\_B}$ is the value of a relative reflectance the error of a patch printed with the first and second marking engines;

$RR(AC)_{Engine\_A}$, $RR(AC)_{Engine\_B}$ is the relative reflectance value of a patch printed with the first and second marking engines; and $RR(AC)_{Target\_A}$, $RR(AC)_{Target\_A}$ is the reflectance value of the target for a corresponding patch for the first and second marking engines.

An engine to engine error determining device or algorithm 190 compares error A to error B and determines 192 an engine to engine error $RR\_ERR(AC)_{AB}$:

$$RR\_ERR(AC)_{AB} = RR\_ERR(AC)_{Engine\_A} - RR\_ERR(AC)_{Engine\_B}, \quad (5)$$

where $RR\_ERR(AC)_{AB}$ is the value of the engine to engine error;

$RR\_ERR(AC)_{Engine\_A}$ is the value of the error of a patch printed with the first marking engine; and $RR\_ERR(AC)_{Engine\_B}$ is the value of the error of a patch printed with the second marking engine.

An image quality controller or control algorithm or device 200 compares 202 the determined engine to engine error $RR\_ERR(AC)_{AB}$ with a first predetermined threshold $T_{H1}$. If the determined engine to engine error $RR\_ERR(AC)_{AB}$ is less than or equal to the first predetermined threshold $T_{H1}$, the normal quality control operation of the document processing system 6 continues, e.g. the control patches are printed and checked as described above. If the determined engine to engine error $RR\_ERR(AC)_{AB}$ is greater than the first predetermined threshold $T_{H1}$, the image quality controller 200 selects an adjustment method and adjusts 204 at least one of the marking engines 10, 12.

More specifically, a decomposing algorithm or device or processor 210 decomposes 212 the determined engine to engine error values to extract lightening and residual components 214. The image quality controller 200 determines 216 whether the residual component is present. If no residual component is present, at least one of the first and second engine xerographic adjusting device 120, 122 adjusts lightness 220 of one of the first and second marking engines 10, 12 as described below. If the residual component is present, the image quality controller 200 compares 222 the residual component to a second predetermined threshold $T_{H2}$. If the residual component is greater than the second threshold $T_{H2}$, at least one of the first and second local image adjusting device 128, 130 adjusts contrast 224 of at least one of the first and second marking engine 10, 12 as described, for example, in U.S. Patent Application Publication No. 2003/0090729, identified above. If the residual component is less than or equal to the second threshold $T_{H2}$, both lightness and contrast are adjusted 226 of at least one of the first and second marking engines 10, 12 in accordance with the values of the lightening and residual components by the first and second printer xerographic adjusting devices 120, 122 and first and second local image adjusting devices 128, 130.

Figure 6:
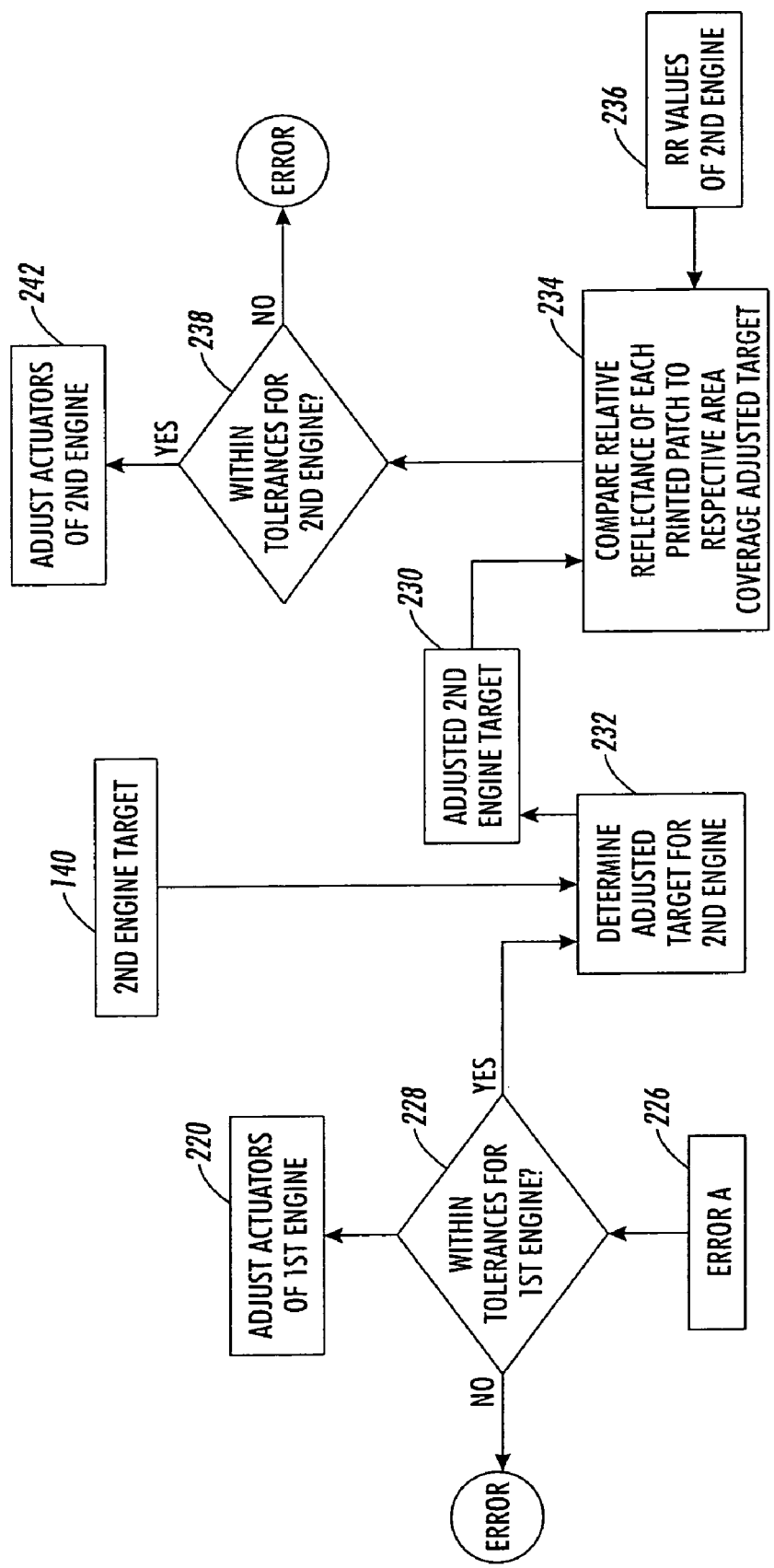
FIG. 6 is a flow chart of a portion of a detailed control methodology for adjusting print uniformity in the document processing system.

With continuing reference to FIGS. 2 and 4 further reference to FIG. 6, to adjust the lightening component, the lightness of the second marking engine 12 is adjusted based on the first engine error $RR\_ERR(AC)_{Engine\_A}$. E.g., the first marking engine 10 remains the same, while the second marking engine 12 tracks the print density of the first marking engine 10.

More specifically, the relative reflectance error (error A) 226 of the first marking engine 10 is compared 228 to predetermined tolerances of the first marking engine 10. If the error A is outside of the tolerances, the document processing system 6 is errored out. If the error A is within the tolerances, a modified or adjusted second engine target 230 is determined 232 for each patch for the second marking engine 12:

$$RR'(AC)_{Target\_B} = RR(AC)_{Target\_B} + RR\_ERR(AC)_{Engine\_A}, \quad (6)$$

where $RR'(AC)_{Target\_B}$ is the new adjusted reflectance value of the adjusted second target for a corresponding patch for the second marking engine;

$RR\_ERR(AC)_{Engine\_A}$ is the relative reflectance error value of a patch printed with the first marking engine; and $RR(AC)_{Target\_B}$ is the reflectance value of the previous second target for a corresponding patch for the second marking engine.

In one embodiment, a filter filters the determined relative reflectance error values $RR\_ERR(AC)_{Engine\_A}$ for each patch printed with the first marking engine 10. For example, the filter averages the error values, rejects too low or too high values, and the like. The modified second engine target 230 is determined based on the averaged relative reflectance error values of the first marking engine 10.

The engine error determining algorithm 180 compares 234 the determined relative reflectance 236 of each patch printed with the second marking engine 12 to a corresponding reflectance value of one of the modified second targets 230 and determines a value of a modified error of each patch printed with the second marking engine 12:

$$RR\_ERR(AC)'_{Engine\_B} = RR(AC)_{Engine\_B} - RR'(AC)_{Target\_B}, \quad (7)$$

where $RR\_ERR(AC)'_{Engine\_B}$ is the modified value of the relative reflectance error of a patch printed with the second marking engine;

$RR(AC)_{Engine\_B}$ is the relative reflectance value of a patch printed with the second marking engine; and $RR'(AC)_{Target\_B}$ is the reflectance value of the adjusted second target of a given patch for the second marking engine.

The determined modified relative reflectance error of the second marking engine 12 is compared 238 to predetermined tolerances of the second marking engine 12. If the modified relative reflectance error of the second marking engine 12 is outside of tolerances, the document processing system 6 is errored out. If the modified relative reflectance error is within the tolerances, corresponding actuators 240 of at least one of the first and second marking engine 10, 12 as known in the art are adjusted 242 to improve image quality in the print job production so that the density of portions of the print job printed with the second marking engine 12 substantially matches the density of portions of the print job printed with the first marking engine 10.

In one embodiment, to adjust lightening component, the determined engine to engine error value $RR\_ERR(AC)_{AB}$ of each patch is compared to a precalculated goal. For example, a minimum stability acceptance curve is derived from the studies as 95% of an acceptance curve. The goal curve is derived, for example, as 50% of the minimum acceptance curve.

If the engine to engine error value $RR\_ERR(AC)_{AB}$ is greater than the goal value $G\_ERR(AC)_{AB}$ for the patch, the one of the first and second engine xerographic adjusting device 120, 122 selects one of the control strategies or algorithms such as, for example, one or more targets are adjusted in the manner described above, one or more printing system actuators 240 are adjusted or the printing system 6 is reset.

Of course, it is contemplated that the lightness of the marking engines can be adjusted by adjusting each single engine's lightness in accordance with predetermined tolerances.

Figure 7:
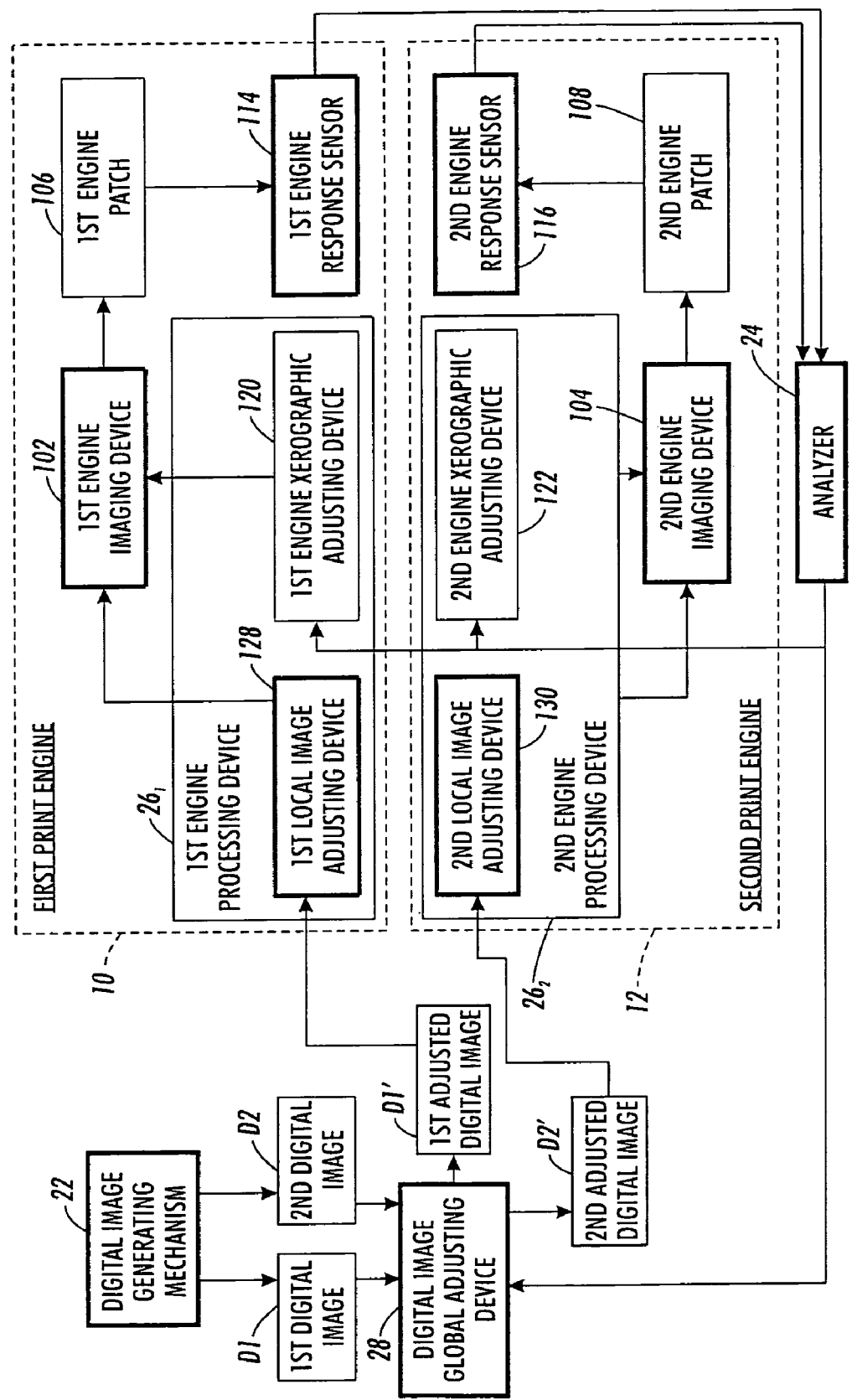
FIG. 7 diagrammatically illustrates a portion of the document processing system.
Figure 8:
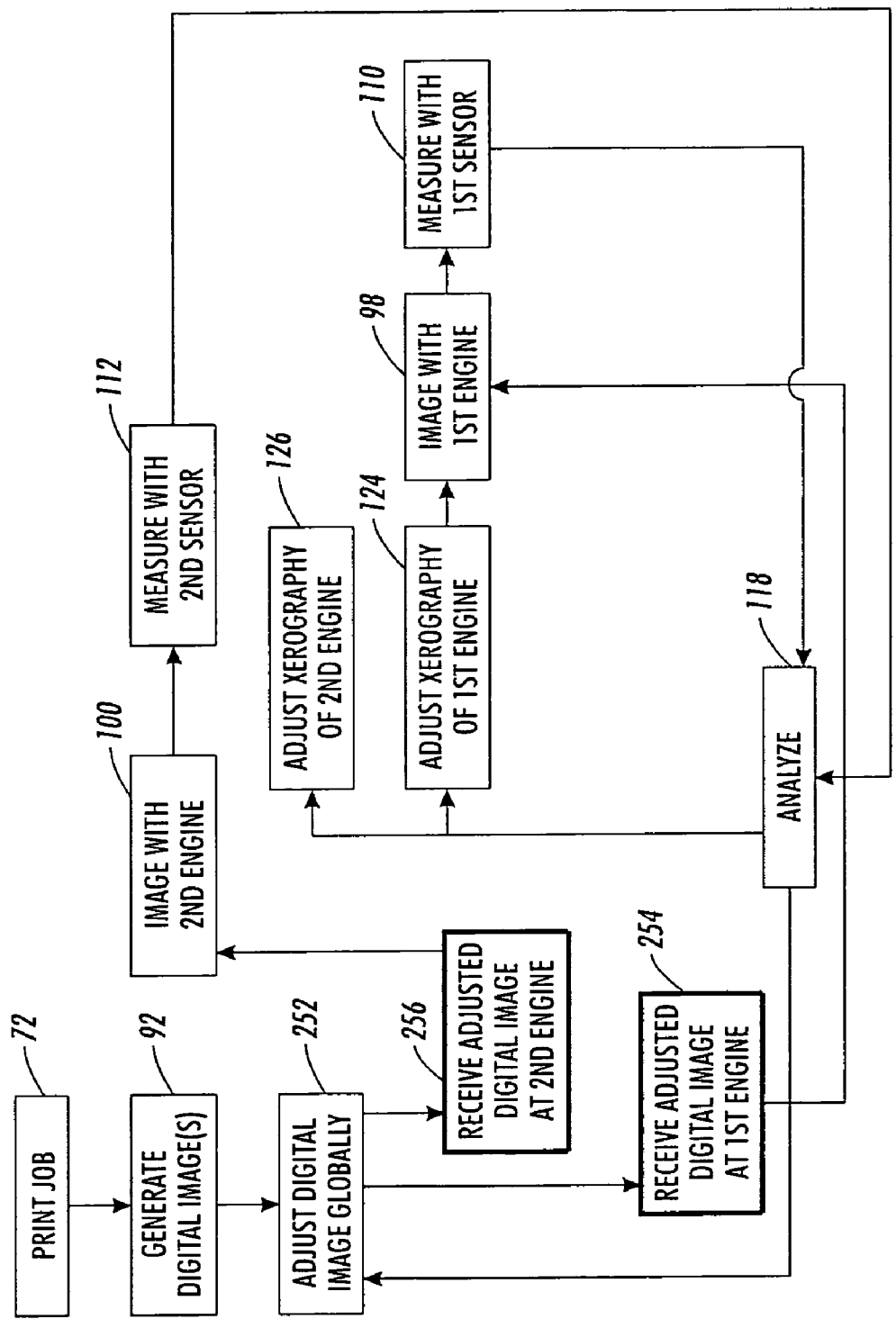
FIG. 8 is a flow chart of a portion of a control methodology for adjusting print uniformity in the document processing system.

With reference to FIGS. 7 and 8, in this embodiment, the digital image generating mechanism 22 generates 92 digital images D1, D2 for the first and second print engines 10, 12. A digital image global adjusting device 28 adjusts 252 contrast for the digital image data as determined by the image quality control device 200 before the adjusted digital images D1', D2' are received 254, 256 by the first and second marking engines 10, 12. In one embodiment, the globally adjusted digital images D1', D2' are adjusted by at least one of the local image adjusting device 128, 130 at the associated marking engine 10, 12. The algorithms for adjusting contrast, e.g. binary values, of the digital images are known in the art, such as, for example, the algorithms described in U.S. Patent Application Publication No. 2003/0090729, identified above.

In the manner described above, the printing system 6 is adjusted in a real time to compensate for differences in lightness and contrast so that the density of portions of the print job printed with the first marking engine 10 substantially matches the density of portions of the print job printed with the second engine 12. By analyzing the lightening and residual components, the more substantial adjustments are made by a use of xerography. The additional, only as needed, adjustments are done to the binary image. As a result, the artifacts, that typically are caused by adjustments to the digital image, are minimized, particularly in such complex areas as tinted embedded text.

In one embodiment, each image element is tagged and individually adjusted. Tags identify, for example, each image element as fine, line, pictorial, text, and the like.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   printing a first series of control patches with a first marking engine;
   printing a second series of control patches with a second marking engine;
   measuring first relative reflectance values of the patches printed with the first marking engine and second relative reflectance values of the patches printed with the second marking engine with respective first and second engine response sensors;
   calculating first patch error values based on comparing the relative reflectance values of the first patches and first target values for the first marking engine and calculating second patch error values based on comparing the relative reflectance values of the second patches and the second target values for the second marking engine;
   calculating a relative engine-to-engine error based on at least on a difference between the calculated first patch error values and the calculated second patch error values;
   decomposing the engine to engine error into lightness and contrast components if the relative engine-to-engine error is greater than a first threshold value; and
   based on the decomposition, determining adjustment of at least binary values of a digital image so that print density of a first marking engine output substantially matches print density of a second marking engine output including:
      determining if the contrast component is present,
      adjusting the lightness component of at least one of the first and second marking engine if the contrast component is not present, and
      adjusting at least a contrast component in at least one of the first and second marking engines if the contrast component is present.

2. The method of claim 1,
   wherein the adjusting the lightness component includes:
   tracking a print density of the second marking engine by the first marking engine;
   comparing the first relative reflectance values to predetermined tolerances; and,
   modifying the digital image if the first patch error values are within the predetermined tolerances.

3. The method of claim 2, wherein
   the measuring of the relative reflectance values includes:
   measuring voltage values for each patch printed with the corresponding first and second marking engines;
   filtering the measured voltage values;
   averaging the filtered voltage values; and,
   calculating the relative reflectance values using the averaged voltage values.

4. The method of claim 3, wherein the step of determining adjustment includes:
   comparing the contrast component to a second threshold value;
   adjusting contrast of at least the first or second marking engine if the contrast is less than the second threshold value; and,
   adjusting both the lightness component and the contrast component of one of the first and second marking engines according to the lightness component and the contrast of the other of the first and second marking engines.

5. The method of claim 4, wherein the
   modifying includes:
   determining an adjusted target value for the second marking engine by adding the first patch error to the second relative reflectance value.

6. The method of claim 5, wherein the modifying further includes:
   calculating modified second patch error values based on a difference between the second relative reflectance values and the adjusted target values.

7. The method of claim 6, wherein the modifying further includes:
   comparing the modified second patch error values to the predetermined tolerances.

8. The method of claim 7, wherein the modifying further includes:
   adjusting an actuator of at least one of the first and second marking engine if the modified second patch error values are within the predetermined tolerances.

9. At least one xerographic marking engine for performing steps of claim 1.

10. A document processing system comprising:
   marking engines, which each prints a predetermined series of control patches, wherein each control patch within the predetermined series is printed with a preselected area coverage that is different from a rest of the patches within the series;
   response sensors, which each measures black tone area coverage voltage value from each patch printed with at least each respective first and second marking engine;
   calculating relative reflectance values for each patch based on the measured voltage values
   an engine error determining device calculating patch error values for each patch based on comparing the relative reflectance values and target values;
   an engine to engine error determining algorithm for determining a relative engine to engine error between the first and second marking engines based at least on a difference between the patch error values for patches printed from a first marking engine and the patch error values for the patches printed from at least a second marking engine;
   a decomposing device, which decomposes the determined engine to engine error into lightness and contrast components; and
   an image quality control device, which, based on the determined components, determines at least binary adjustment values for an image; wherein
   the lightness component of at least one of marking engines is adjusted if the contrast component is not present and the contrast component of one of the first and at least second marking engines is adjusted if the contrast component is present.

11. The system of claim 10, wherein, based on the determined lightening component, the image quality control device further determines xerography adjustments of at least one of the first and second marking engine.

12. The system of claim 11, wherein each marking engine further includes:
   a xerographic adjusting device, which adjusts xerography of a corresponding first or second marking engine so that lightness of a tone reproduction curve of the first marking engine substantially matches lightness of a tone reproduction curve of the second marking engine by comparing the contrast component to a second threshold value, adjusting contrast of the first or at least second marking engine if the contrast is less than the second threshold value; and,
   adjusting both the lightness component and the contrast component of one of the first and at least second marking engines according to the lightness component and the contrast of the other of the first and at least second marking engines.

13. The system of claim 12, wherein each marking engine includes:
   a local image adjusting device, which adjusts the binary values of the digital image based on the determined contrast component by fixing the first marking engine to track a printing density of the at least second marking engine and comparing the patch error values of the first marking engine to a range of predetermined threshold tolerances, and wherein the digital image is modified if the patch error values of the first marking engine are within the tolerances.

14. The system of claim 12, further including:
   a global image adjusting device which adjusts the binary values of the digital image based on the determined contrast component by determining adjusted target values for the at least second marking engine by adding the patch error values of the first marking engine to the relative reflectance values for the at least second marking engine, calculating modified patch error values for the at least second marking engine based on a difference between the relative reflectance values of the at least second marking engine and the adjusted target values, comparing the modified patch error values to the predetermined tolerances, adjusting an actuator of the marking engines if the modified patch error values are within the predetermined tolerances.

15. The system of claim 10, wherein at least one marking engine includes a xerographic marking engine.

16. A document processing system comprising:
   marking engines, which each prints a predetermined series of control patches, wherein each control patch within the predetermined series is printed with a preselected area coverage that is different than a rest of the patches within the series;
   first and second patch sensors, which each measures black tone area coverage voltage values from each control patch printed with at least first and second marking engines; and
   a computer which is programmed to perform steps of:
      calculating patch error values based on the measured voltage reflectance values of the patches;
      based at least on a difference of the calculated patch error values the control patches printed with the first and second marking engines, calculating a relative engine to engine error,
      extracting lightness and contrast components from the engine to engine error, and
      based on values of the extracted components, determining at least one of adjustment of binary values of a digital image and lightness of a tone reproduction curve of at least one marking engine—so that print density of a first marking engine output substantially matches print density of a second marking engine output,
   wherein the lightness component of at least one of marking engines is adjusted if the contrast component is not present and the contrast component of one of the first and at least second marking engines is adjusted if the contrast component is present.

17. The system of claim 16, further including:
   a xerographic adjusting device, which, based on the extracted lightening component, adjusts xerography of a corresponding first or second marking engine so that lightness of the tone reproduction curve of the first marking engine matches lightness of the tone reproduction curve of the second marking engine,
   wherein the contrast component is compared to a second threshold value,
   the contrast of the first or at least second marking engine is adjusted if the contrast is less than the second threshold value; and,
   the lightness component and the contrast component of one of the first and at least second marking engines is adjusted according to the lightness component and the contrast of the other of the first and at least second marking engines.

18. The system of claim 17, further including:

a digital image generating device, which generates a digital image and sends the digital image to the marking engines for printing; and a local image adjusting device, which adjusts the binary values of the digital image, which is received by an associated marking engine, based on the determined contrast component prior to printing, wherein the first marking engine is fixed to track a printing density of the at least second marking engine and the patch error values of the first marking engine are compared to a range of predetermined threshold tolerances, and wherein the digital image is modified if the patch error values of the first marking engine are within the tolerances.

19. The system of claim 17, further including:

a digital image generating device which generates a digital image for each respective marking engine; and a global image adjusting device, which, based on the determined contrast component, adjusts the binary values of each generated digital image and sends each adjusted digital image to the corresponding marking engine for printing, wherein adjusted target values are determined for the at least second marking engine by adding the patch error values of the first marking engine to the relative reflectance values for the at least second marking engine, modified patch error values are calculated for the at least second marking engine based on a difference between the relative reflectance values of the at least second marking engine and the adjusted target values, modified patch error values are compared to the predetermined tolerances, and an actuator of the marking engines is adjusted if the modified patch error values are within the predetermined tolerances.

* * * * *